US012729052B1

(12) United States Patent
Mccafferty

(10) Patent No.: US 12,729,052 B1
(45) Date of Patent: Sep. 8, 2026

(54) NOZZLE

(71) Applicant: HE-Products LLC, Caldwell, ID (US)

(72) Inventor: Matthew Robert Mccafferty, Caldwell, ID (US)

(73) Assignee: HE-Products LLC

( * ) Notice: Subject to any disclaimer, the term of this patent is extended or adjusted under 35 U.S.C. 154(b) by 949 days.

(21) Appl. No.: 17/524,381

(22) Filed: Nov. 11, 2021

Related U.S. Application Data

(60) Provisional application No. 63/113,023, filed on Nov. 12, 2020.

(51) Int. Cl.
*B05B 1/04* (2006.01)
*B05C 11/04* (2006.01)
*B65D 83/303* (2025.01)

(52) U.S. Cl.
CPC ............ *B65D 83/303* (2013.01); *B05C 11/04* (2013.01); *B05B 1/04* (2013.01)

(58) Field of Classification Search
CPC ......... B05C 11/04; B05B 1/042; B05B 1/044; B65D 83/303
See application file for complete search history.

(56) References Cited

U.S. PATENT DOCUMENTS 577,362 A * 2/1897 Ettlinger ................. B05B 1/044 239/592
1,239,373 A * 9/1917 Farmer et al. .......... B05B 1/042 239/594
2,130,173 A * 9/1938 Barnes .................... B05B 1/042 29/890.143
4,633,623 A * 1/1987 Spitz ......................... B24C 5/04 376/316
4,688,720 A * 8/1987 MacDonald ............ B05B 1/042 239/592
5,283,990 A * 2/1994 Shank, Jr. ............... B05B 1/044 239/592
5,616,067 A * 4/1997 Goenka ..................... B24C 5/04 451/39
6,293,857 B1 * 9/2001 Allard ..................... B24C 1/086 451/75
6,969,015 B1 * 11/2005 Salmela .................. B05B 1/042 239/455
11,219,907 B1 * 1/2022 McCafferty ........... B05B 13/005
2001/0042506 A1 * 11/2001 Hogan ...................... B05B 7/10 118/300
2009/0193615 A1 * 8/2009 Nguyen .................. B05B 1/042 15/415.1
2012/0175437 A1 * 7/2012 Sloan, Jr. .................. B05B 1/00 239/597
2013/0264400 A1 * 10/2013 Crandley ............. B65D 83/303 239/589

(Continued)

*Primary Examiner* — Joseph A Greenlund

(74) *Attorney, Agent, or Firm* — AP Patents; Alexander Pokot

(57) ABSTRACT

A nozzle includes a body with a hollow interior. An inlet is provided in one exterior surface of the body, the inlet being in an open communication with the hollow interior. An outlet is provided in a different exterior surface of the body, the outlet being in an open communication with the hollow interior. The outlet may have a shape that is different than a shape of the inlet. The outlet may have an area at the different exterior surface of the body being equal to an area of the inlet at the one exterior surface of the body. The nozzle may be used to broadcast mechanical foam.

20 Claims, 5 Drawing Sheets

(56) References Cited

U.S. PATENT DOCUMENTS

| | | | | |
|---|---|---|---|---|
| 2014/0103147 | A1* | 4/2014 | Dodson | F25C 3/04 239/597 |
| 2015/0014219 | A1* | 1/2015 | Spiess | B01D 19/0047 196/128 |
| 2017/0113326 | A1* | 4/2017 | Nguyen | B05B 1/044 |
| 2018/0029717 | A1* | 2/2018 | Al-Alusi | B64D 13/00 |
| 2019/0070617 | A1* | 3/2019 | Haider | F27D 1/1636 |
| 2019/0381524 | A1* | 12/2019 | Kulkarni | B05B 7/1481 |
| 2021/0086006 | A1* | 3/2021 | Sethi | B05B 1/3402 |
| 2021/0086203 | A1* | 3/2021 | Sethi | B05B 1/02 |
| 2021/0379607 | A1* | 12/2021 | Wang | A61C 17/0202 |
| 2022/0297138 | A1* | 9/2022 | Sethi | B05B 1/182 |
| 2024/0139759 | A1* | 5/2024 | Jozwiak | B05B 1/044 |

* cited by examiner

NOZZLE

CROSS-REFERENCE TO RELATED APPLICATIONS

This present nonprovisional application is related to and claims benefit of priority under 35 U.S.C. .sctn. 119(e) from U.S. Provisional Patent Application Ser. No. 63/113,023 filed on Nov. 12, 2020 and titled "Spray Nozzle", which is hereby incorporated by reference in its entirety.

STATEMENT REGARDING FEDERALLY SPONSORED RESEARCH AND DEVELOPMENT

N/A

REFERENCE TO SEQUENCE LISTING, A TABLE, OR A COMPUTER PROGRAM LISTING COMPACT DISC APPENDIX

N/A

TECHNICAL FIELD

The subject matter relates to nozzles. It may further relate to nozzles for spraying or broadcasting foam products. It may further relate to nozzles for spraying or broadcasting mechanical foam.

BRIEF DESCRIPTION OF THE DRAWINGS

The accompanying drawings are incorporated in and constitute part of the specification and illustrate various embodiments. In the drawings.

DETAILED DESCRIPTION OF THE SUBJECT MATTER

Figure 1:
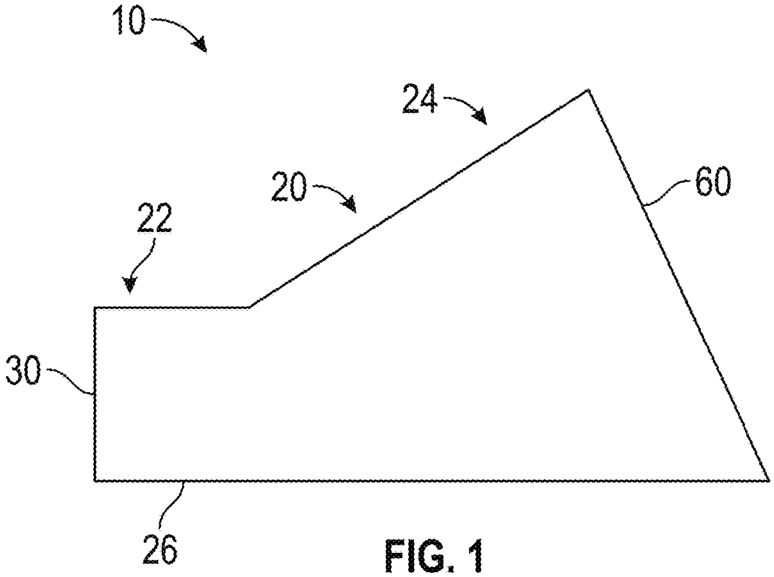
FIG. 1 illustrates an elevation view of a nozzle.

Prior to proceeding to the more detailed description of the present subject matter, it should be noted that, for the sake of clarity and understanding, identical components which have identical functions have been identified with identical reference numerals throughout the several views illustrated in the drawing figures.

Features which are described in the context of separate embodiments may also be provided in combination in a single embodiment. Conversely, various features which are, for brevity, described in the context of a single embodiment, may also be provided separately or in any suitable subcombination. The Applicant hereby gives notice that new Claims may be formulated to such features and/or combinations of such features during the prosecution of the present Application or of any further Application derived therefrom.

For purposes here, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or," "only one of," or similar language; or (ii) two or more of the listed alternatives are mutually exclusive within the particular context, in which case "or" would encompass only those combinations involving non-mutually-exclusive alternatives. For purposes here, the words "comprising," "including," "having," and variants thereof, wherever they appear, shall be construed as open-ended terminology, with the same meaning as if the phrase "at least" were appended after each instance thereof.

It is to be understood that the singular forms "a," "an," and "the" include plural referents unless the context clearly dictates otherwise. Thus, for example, reference to "a component surface" includes reference to one or more of such surfaces.

For purposes here, unless otherwise expressly specified, the words "comprising," "including," "having," and variants thereof, wherever they appear, shall be construed as open-ended terminology, with the same meaning as if the phrase "at least" were appended after each instance thereof.

The verb "may" is used to designate words, something that optionality/noncompulsoriness. In other "may" can, but need not.

Before elucidating the subject matter shown in the Figures, the present disclosure will be first described in general terms.

General Description

A nozzle is provided to spray (eject, emit, dispense, broadcast) a substance over a distance. The substance may comprise a fluid. The substance may comprise a foam. The substance may comprise a mechanical foam. The substance may comprise an aqueous matter.

A nozzle is designed with an inlet surface. During use or operation of the nozzle, the inlet surface is positioned to face a source of a substance supply.

The inlet surface has an inlet port. A shape of the inlet port may be any one of a round, a partially curved, a fully curved, square, rectangle, triangle and the like shapes. The shape of the inlet may be referred to as a first shape in this document. The inlet surface may be flat. The inlet surface may be curved. The inlet surface may be provided as a combination of flat and curved surface portions.

The nozzle is also designed with an outlet surface. During use or operation, the outlet surface is oriented toward an environment designated to receive the substance. The outlet surface may be flat. The outlet surface may be curved. The outlet surface may be provided as a combination of flat and curved surface portions.

The outlet surface may be disposed at an incline to the inlet surface. The outlet surface has an outlet port. The outlet port may be referred to as a discharge opening or a discharge port. A shape of the outlet port may be different than the shape of the inlet port. The shape of the outlet port may be referred to as a second shape in this document. An area of the outlet port may be designed equal to an area of the inlet port. In other words, a ratio of the area of the inlet port to the area of the outlet port may be 1:1.

The nozzle is also designed with a hollow inlet portion extending from the inlet port toward the outlet port. An end of the hollow inlet portion is disposed at a distance from the outlet surface. The inlet surface defines a start of the hollow inlet portion. It is to be understood that a distance between the end and the start defines a depth of the hollow inlet portion. The hollow inlet portion can be referred to as a hollow space or as a hollow inlet space.

The nozzle is also designed with a hollow outlet portion that extends from the outlet port toward the inlet port. The hollow outlet portion has a shape being substantially identical to the second shape of the outlet port, except for manufacturing tolerances. The hollow outlet portion intersects each of a surface of the hollow inlet portion adjacent the end thereof and a surface of the hollow inlet portion to provide a passageway from the inlet port to the outlet port.

A cross-sectional size or area of the hollow outlet portion at an intersection with the hollow inlet portion may be designed to be identical, except for manufacturing tolerances, to a cross-sectional size or area of the hollow outlet portion at the outlet port.

To achieve unrestricted flow from the inlet port to the outlet port, the hollow outlet portion continues from the intersection toward the inlet surface, past the end of the hollow inlet portion. The size progression of this hollow outlet portion defines an incline and generates a thrust to broadcast the substance for a longer distance away from the outlet surface of the nozzle and use a reduced pressure of the substance flow at the inlet.

A cross-sectional size or area of the hollow outlet portion at an intersection with the hollow inlet portion may be designed to be smaller than a cross-sectional size or area of the hollow outlet portion at the outlet port.

The depth of the hollow inlet portion may be sized such that a combined area of the hollow inlet portion and the hollow outlet portion is being substantially equal to either one of the area of the inlet port and the area of the outlet port. A consistent surface area of the substance flow from the inlet port to the outlet port at least reduces if not completely eliminates drag onto the substance flow to and through the outlet port.

Each of the inlet surface and the outlet surface may be provided as an exterior surface of a nozzle body. The nozzle body may also be referred to as a body. The inlet port may be referred to as an inlet and the outlet port may be referred to as an outlet. Furthermore, the hollow inlet and outlet portions define a hollow interior of the nozzle body. Accordingly, the nozzle may be designed with a nozzle body with a hollow interior, an inlet in one, or a first, exterior surface of the body, the inlet being in an open communication with the hollow interior, and an outlet in a different, or a second, exterior surface of the body, the outlet being in an open communication with the hollow interior, where the outlet has a shape being different than a shape of the inlet and where the outlet has an area at the different exterior surface of the body being equal to an area of the inlet at the exterior surface of the body. The term "open communication" at least refers to that the hollow interior is open to the outside of the nozzle body and can be accessed from the outside of the nozzle body through the inlet and the outlet.

The nozzle is operable to spray (eject, emit, broadcast) the substance at a point of use. Accordingly, the nozzle may be designed with a body with a hollow interior, an inlet in an open communication with the hollow interior, and an outlet in the open communication with the hollow interior, where the inlet, outlet, and the hollow interior being designed, in a combination, to spray (eject, emit, broadcast) a substance from the outlet, a flow of the substance (substance flow) being received through the inlet and passed through the hollow interior, while at least substantially preventing if not eliminating a restriction to a substance flow within the hollow interior from the inlet to the outlet.

The nozzle may be designed with a body with a hollow interior, an inlet in or on the body, the inlet being in an open communication with the hollow interior, and an outlet in or on the body, the outlet being in the open communication with the hollow interior, where the outlet has a shape being different than a shape of the inlet and where the outlet has an area being equal to an area of the inlet.

The outlet may be provided as a plurality of outlets. Accordingly, the nozzle may be designed with a body with a hollow interior, an inlet in an open communication with the hollow interior, and a plurality of outlets, each outlet from the plurality of outlets being in an open communication with the hollow interior, where the plurality of outlets have a combined area at an exterior surface of the body being substantially the same as an area of the inlet at a different exterior surface of the body but where a shape of the inlet is being different than the shape of the outlet. The outlets from the plurality of outlets may have the same size and/or shape, except for manufacturing tolerances. The outlets from the plurality of outlets may have the different sizes and/or shapes. The nozzle with a plurality of outlets may be designed such that each outlet defines a bore into a body of the nozzle, where such each bore intersects a bore extending from the inlet. In this design, a single flow of the substance through the inlet will be divided into a plurality of distinct flows at the outlet. The separation between the outlets within interior of the body of the nozzle may be achieved with one or more baffles to direct a substance flow from the inlet to each outlet from the plurality of outlets. The outlets of different sizes may broadcast the substance at different distances from the nozzle. A smaller size of the outlet may enable the substance to be broadcasted for a greater distance than an outlet with a large size. This design may be used to target different application areas. This design may be used to broadcast distinct portion of the substance that may merge with each other over time into a continuous shape of the substance.

Use of the nozzle in different applications indicated satisfactory results when the area difference between the outlet and the inlet is within ±10% to ±25%, particularly when the nozzle is configured to broadcast mechanical foam. Accordingly, the nozzle may be designed with a body, a hollow interior within the body, an inlet in one exterior surface of the body, the inlet being in an open communication with the hollow interior, and an outlet in a different exterior surface of the body, the outlet being in an open communication with the hollow interior, where the outlet has a shape being different than a shape of the inlet and where the outlet may have an area at the different exterior surface of the body being between about 90% and about 110% of an area of the inlet at the exterior surface of the body. The outlet may have an area at the different exterior surface of the body being between about 80% and about 120% of an area of the inlet at the exterior surface of the body. The outlet may have an area at the different exterior surface of the body being between about 75% and about 125% of an area of the inlet at the exterior surface of the body. Thus, are refence to the area of the outlet/outlet port being identical or substantially identical to the area of the inlet/inlet port includes the above described differences.

The above ratios may apply to a nozzle with a plurality of outlets that are provided by a plurality of independent passageways (bores) within the body. In other words, the ration of outlets and the inlet may be other than 1:1.

In applications related to mechanical foam, it has been found that using a nozzle with the inlet and outlet of different shapes but substantially identical areas and with the above described arrangement between the hollow outlet portion and the hollow inlet portion converts bubbles in the mechanical foam from an elongated shape at the inlet into a spherical shape at the outlet. Distributing foam bubbles of the spherical shape increases longevity (Stability) of the foam structure. In other words, the foam bubble of spherical shape remain for a longer period of time on the surface before the mechanical foam breakdowns into a liquid state. Accordingly, the mechanical foam nozzle can be designed with a body with a hollow interior, an inlet in a substance communication with each of the hollow interior and a conduit supplying a flow of a mechanical foam, and an outlet in the substance communication with the hollow interior, where the mechanical foam nozzle designed to convert bubbles in the mechanical foam from an elongated shape at the inlet into a spherical shape at the outlet. The conduit may comprise a flexible hose. The conduit may comprise a rigid pipe.

The inlet and the hollow inlet portion may be referred to, in a combination, as an inlet cavity, while the outlet and the outlet port may be referred to, in a combination, as an outlet cavity. Furthermore, it is not necessary that a portion of the nozzle body containing the inlet cavity be of the same shape/size as the portion of the nozzle body containing outlet cavity. Accordingly, the nozzle can be designed with a nozzle body that has an inlet nozzle body portion with an inlet surface and an inlet port in the inlet surface, an outlet nozzle body portion with an outlet surface and an outlet port in the outlet surface, the outlet surface being disposed at an incline to the inlet surface, an inlet cavity in an open communication with the inlet port, the inlet cavity extending, from the inlet port into the outlet nozzle body portion, and an outlet cavity in the outlet portion and in an open communication with the outlet surface, the outlet cavity being configured to intersect the inlet cavity.

The nozzle body may be designed (configured) where the inlet nozzle body portion and the outlet nozzle body portion define a common flat exterior surface of the nozzle body, the common flat exterior surface connecting the inlet surface with the outlet Therefore, the inlet cavity may extend along an axis surface, disposed in a plane being parallel to the common flat exterior surface. This axis also defines a direction of the substance flow from the inlet to the outlet.

Accordingly, the nozzle may be configured with a nozzle body that has an inlet nozzle body portion with an inlet surface and an inlet port in the inlet surface, an outlet nozzle body portion with an outlet surface with an outlet port in the outlet surface, the outlet surface being disposed at an incline to the inlet surface, the inlet nozzle body portion and the outlet nozzle body portion defining a common flat exterior surface of the nozzle body, the common flat exterior surface connecting the inlet surface with the outlet surface, an inlet cavity being in an open communication with the inlet port, the inlet cavity extending, along an axis disposed in a plane being parallel to the common flat exterior surface, from the inlet port into the outlet nozzle body portion, an outlet cavity in the outlet portion and in an open communication with the outlet surface, the outlet cavity being configured to intersect the inlet cavity.

The nozzle, as described above, may be designed with a means for attaching the body onto an object designed to supply substance flow to the inlet. The object may comprise a conduit. The means may comprise a thread extending into the hollow interior. The means may comprise a bore extending into the hollow interior, the bore sized and shaped to receive an exterior surface of the object therewithin. The exterior surface of the object may be received within the bore in a friction fit manner. The means may comprise a quick disconnect coupling. The means may comprise a permanent soldered connection between the body and an end of the object. The means may comprise a projection on the inlet surface of the body, the projection comprising a threaded bore. The means may comprise a projection on the inlet surface of the body, the projection comprising a thread on an exterior surface thereof and a bore that is aligned with the inlet. The means may comprise a taper on the nozzle body. The means may comprise a pin extending outwardly from the body adjacent the inlet, the pin designed to interlock with a groove to detachably attach the nozzle to a source of substance flow supply. The means may comprise an adhesive. The means may comprise a quarter turn fastener connection. The means may comprise a threaded fastener. The means may comprise a quick disconnect coupling. It would be understood that the means, as described above, provide a nozzle attachment element.

The nozzle may be configured with a connection to the source of the substance flow supply. The connection may be a detachable connection. Without limitations, the detachable connection may be provided by any one of a thread, an adhesive, a quick disconnect coupling, and a fastener. The connection may be a non-detachable or a permanent connection. Without limitations, the permanent connection may be provided by any one of an adhesive, a soldering process, a welding process, and a friction fit between the body and the source of the substance flow supply.

A discharge or a broadcasting pattern of the mechanical foam may need to be changed, depending on requirements of an application. Although distinct nozzles may be provided with outlets of different shape, the nozzle may be designed (configured) where the shape of the outlet can be changed without replacing the nozzle body. The nozzle may be designed to receive an adapter in a detachable connection with the outlet of the nozzle. The adapter may have a single aperture (opening) through a thickness of the adapter, where the aperture is shaped differently than the shape of the outlet. The adapter may have more than one aperture (opening) through a thickness of the adapter. The adapter may have a plurality of apertures (openings) through a thickness of the adapter. The apertures in the plurality of apertures (openings) may be of identical shapes and/or sizes. The apertures (openings) in the plurality of apertures may be of different shapes and/or sizes. The apertures (openings) of different sizes may broadcast the substance at different distances from the nozzle. A smaller size of the outlet may enable the substance to be broadcasted for a greater distance than an outlet with a large size. This design may be used to target different application areas.

The exterior surface of the nozzle body may be designed with a cavity that is sized and shaped to receive such adapter in a detachable connection. The detachable connection may comprise an adhesive. The detachable connection may comprise a tong and groove arrangement. The detachable connection may comprise a fastener. The detachable connection may comprise a cavity in the adapter, the cavity being sized and shaped to receive an end of the body therewithin.

The nozzle, as described above, may be manufactured from different materials by a variety of manufacturing processes. The nozzle may be machined from a raw stock of metal or a plastic. The plastic nozzle may be manufactured by a molding process using a mold (tool). The metal nozzle may be manufactured by a casting process. The nozzle may be manufactured by a 3-D printing process. When the nozzle is manufactured as a molded or a casted component, the hollow interior can be referred to as a cavity formed by the tool without any additional machining process. Thus, the nozzle may be designed such that the outlet surface includes a cavity, the cavity being sized and shaped to receive a nozzle adapter with a through opening, the through opening being sized and shaped differently than the outlet port. The nozzle may be designed as a two-piece construction, joined together into a one-piece nozzle at assembly.

Furthermore, in the nozzle, as described above, the inlet or the inlet port may be also referred to as an inlet opening. The outlet or the outlet port may be also referred to as an outlet opening.

The configuration of each of the hollow inlet portion and the hollow outlet portion as well as the relationship therebetween provide for the nozzle, as described above, to spray (eject, emit, broadcast, dispense, discharge) the substance over a greater distance than a nozzle designed only with the hollow inlet portion that would extend from the inlet surface to the outlet surface and where the inlet port and the outlet port would be of the substantially same shape and size.

Although the nozzle is being illustrated in various figures where the hollow interior transitions within the nozzle body from having a round shape in a plane normal to a direction of substance flow to having an elongated shape at the outlet, different inlet and outlet shape can be used, depending on the application. The inlet port may have a square shape defining an inlet cavity with a square shaped cross-section. The inlet port may have a triangular shape defining an inlet cavity with a triangular shaped cross-section. The inlet port may have a rectangular shape defining an inlet cavity with a rectangular shaped cross-section. The connection to the source of the substance flow supply may be than made in a sealing arrangement with the inlet surface of the nozzle.

The exterior shape of the nozzle, as described above, does not have to follow the shape of the hollow interior. In other words, it is not necessary that the nozzle be designed with substantially equal wall thickness throughout the shape, as is illustrated in various Figures. The body of the nozzle may be provided as a spherical member. The body of the nozzle may be provided as a combination of curved and flat surfaces. The exterior surface of the body may be provided with indentations and/or projections for ease of grip by a user, particularly during attachment of the nozzle to the source of substance flow supply.

The nozzle, as described above, may be used in applications that require distribution of a substance, such as fluid, from a source of fluid supply. Such source of fluid supply may include a conduit. The conduit may be a rigid pipe. The conduit may be a flexible house. The conduit may be a combination of a rigid pipe and a flexible hose.

The fluid can be referred to as an aqueous matter. The aqueous matter may be of a single component type. The single component may be a gas. The gas may be a compressed gas. Compressed gas may comprise air under pressure. The gas may be an argon. The gas may be a nitrogen. The single component may be a liquid. The liquid may be water as supplied from a municipal water supply source. The aqueous matter may have two or more components. For example, the aqueous matter may be a combination of water and a foam concentrate.

Thus, the nozzle, as described above, may be used for dispensing foam, such as a mechanical foam. The mechanical foam may be a hydrolized protein material, made up of closely formed bubbles having water-retention properties and stability. The nozzle configured to broadcast mechanical foam may be generated by an agitation of air, water and foam concentrate. The nozzle configured to broadcast mechanical foam may be used to disinfect surfaces. The nozzle configured to broadcast mechanical foam may be used to distinguish flame or fires. The nozzle, as described above, may be configured for a connection, at the inlet, to an end of the nozzle used in a fire-fighting equipment to generate mechanical foam. The nozzle configured to broadcast mechanical foam may be used in a car wash as a spray head. The nozzle configured to broadcast mechanical foam may be used to clean equipment in a manufacturing environment.

When dispensing the mechanical foam, the above described intersection of the hollow outlet portion with the hollow inlet portion converts the foam bubbles from an elongated shape at the inlet to a spherical shape at the outlet, thus increasing longevity of the sprayed foam on a surface. Any restriction will cause the bubbles to break down and have inefficiency. Broadcasted broken down bubbles may lose uniformity due to imbalance of pressure from one bubble to another. Once, uniformity is lost, bubbles may break down much faster. Restriction accelerates the process of breaking down the bubbles by changing the shapes of the bubbles and further causes compression of the bubbles.

The nozzle, as described above, may be used for dispensing different substances. The nozzle, as described above, may be configured to spray or broadcast seeds, for example in a hydroseeding application. The nozzle, as described above, may be configured to spray ingredients. The nozzle, as described above, may be configured to spray a fructose or a corn syrup substance that is to be mixed with water for a purpose of glazing or coating a food product, for example such as a doughnut. The nozzle, as described above, may be configured to spray a mono sodium gluconate (MSG). The nozzle, as described above, may be used in sanitary applications.

When the incline is oriented vertically, the spray pattern may resemble a rainbow shape with the substance being emitted for a longer distance but leaves a narrow "foot print" on the surface. In mechanical foam applications, this orientation of the nozzle may be used in spraying mechanical foam to sanitize a fork lift truck door or opening.

When the incline is oriented horizontally, the spray pattern of the substance may leave a wider "foot print" on the surface but the substance may be emitted for a shorter distance. In mechanical foam applications, this orientation of the nozzle may be used in spraying mechanical foam to sanitize a foot traffic area at a doorway.

It is not necessary to broadcast the substance as a continuous substance immediately upon discharge from the outlet(s). When the substance is broadcasted in different portions, each portion may change shape over time and merge with a neighboring or adjacent portion. In a non-limiting example of broadcasting portions (globs) of mechanical foam, each glob will lose its height and/or shape over time as bubbles break, expanding in area and merging with the adjacent portion (glob). Then, re-broadcasting of the mechanical foam after a period of time to re-establish effectiveness can be also achieved by re-broadcasting portions of mechanical foam over the previously covered area.

In view of the above, the nozzle may be designed as a non-mixing nozzle. In view of the above, the nozzle may be designed as a non-atomizing nozzle. In view of the above, the nozzle may be designed as a non-aspirating nozzle. In view of the above, the nozzle may be designed as a non-foaming nozzle that discharges foam. In view of the above, the nozzle may be designed as a nozzle that does not generate the substance. In view of the above, the nozzle may be designed as a nozzle that does not use an eductor within the hollow interior. In view of the above, the nozzle may be designed as a nozzle that does not use a diffuser within the hollow interior.

EMBODIMENTS

In an embodiment, a nozzle comprises a body; a hollow interior; an inlet in one exterior surface of the body, the inlet being in an open communication with the hollow interior; and an outlet in a different exterior surface of the body, the outlet being in an open communication with the hollow interior; the outlet having a shape being different than a shape of the inlet; the outlet having an area at the different exterior surface of the body being equal to an area of the inlet at the one exterior surface of the body.

A feature of this embodiment is that the inlet comprises a thread extending into the hollow interior.

A feature of this embodiment is that the inlet comprises a bore extending into the hollow interior.

A feature of this embodiment is that the hollow interior comprises a transition, within the body, from a round shape in a plane normal to a direction of a substance flow at the inlet to an elongated shape at the outlet.

A feature of this embodiment is that the outlet comprises a plurality of outlets.

A feature of this embodiment is that the nozzle further comprises a means for attaching the body onto a conduit designed to supply a substance flow to the inlet.

A feature of this embodiment is that the means comprises a thread extending into the hollow interior.

A feature of this embodiment is that the means comprises a bore extending into the hollow interior, the bore sized and shaped to receive an exterior surface of a conduit configured to deliver the substance flow to the inlet.

A feature of this embodiment is that the means comprises a quick disconnect coupling.

A feature of this embodiment is that the means comprises a permanent soldered connection with an end of a conduit configured to deliver the substance flow to the inlet.

A feature of this embodiment is that the means comprises a projection on the one exterior surface of the body, the projection comprising a threaded bore.

A feature of this embodiment is that the means comprises a projection on the one exterior surface of the body, the projection comprising a thread on an exterior surface thereof.

A feature of this embodiment is that the means comprises a taper on the body.

A feature of this embodiment is that the means comprises a pin extending from the body adjacent the inlet, the pin designed to interlock with a groove to detachably attach the nozzle to a source of the substance flow.

A feature of this embodiment is that the means comprises an adhesive.

In an embodiment, a nozzle comprises a body; a hollow interior; an inlet in an open communication with the hollow interior; and an outlet in the open communication with the hollow interior; the inlet, outlet, and the hollow interior being designed to discharge a substance from the outlet, the substance being received through the inlet and passed through the hollow interior, without a restriction to a substance flow within the hollow interior.

In an embodiment, a nozzle comprises a body; a hollow interior; an inlet in an open communication with the hollow interior; and a plurality of outlets, each outlet from the plurality of outlets being in an open communication with the hollow interior; the plurality of outlets having a combined area at an exterior surface of the body being equal to an area of the inlet at a different exterior surface of the body; the hollow interior comprising one or more baffles to direct a substance flow from the inlet to the each outlet.

In an embodiment, a nozzle comprises a body; a hollow interior; an inlet in or on the body, the inlet being in an open communication with the hollow interior; and an outlet in or on the body, the outlet being in the open communication with the hollow interior; the outlet having a shape being different than a shape of the inlet; the outlet having an area being equal to an area of the inlet.

A feature of this embodiment is that the inlet comprises a threaded bore.

A feature of this embodiment is that the outlet comprises an aperture in an exterior surface of the body.

A feature of this embodiment is that the outlet comprises an adapter with a through aperture, the adapter being in a detachable connection with an exterior surface of the body.

A feature of this embodiment is that the detachable connection comprises an adhesive.

A feature of this embodiment is that detachable connection comprises a tong and groove arrangement.

A feature of this embodiment is that detachable connection comprises a fastener.

A feature of this embodiment is that the detachable connection comprises a cavity in the adapter, the cavity being sized and shaped to receive an end of the body therewithin.

In an embodiment, a nozzle comprises a body; a hollow interior; an inlet in one exterior surface of the body, the inlet being in an open communication with the hollow interior; and an outlet in a different exterior surface of the body, the outlet being in an open communication with the hollow interior; the outlet having a shape being different than a shape of the inlet; the outlet having an area at the different exterior surface of the body being between 90% and 110% of an area of the inlet at the one exterior surface of the body.

In an embodiment, a mechanical foam nozzle comprises a body; a hollow interior; an inlet in a substance communication with each of the hollow interior and a conduit supplying a flow of a mechanical foam; and an outlet in the substance communication with the hollow interior; the mechanical foam nozzle designed to convert bubbles in the mechanical foam from an elongated shape at the inlet into a spherical shape at the outlet.

In an embodiment, a nozzle comprises an inlet surface with an inlet port in the inlet surface, the inlet port having a first shape; an outlet surface with an outlet port in the outlet surface, the outlet surface being disposed at an incline to the inlet surface, the outlet port having a second shape, the second shape being different than the first shape, the outlet port having an area being equal to an area of the inlet port;

a hollow inlet portion extending from the inlet port toward the outlet port, an end of the hollow inlet portion disposed at a distance from the outlet surface; and a hollow outlet portion extending from the outlet port toward the inlet port, the hollow outlet portion having a shape being identical to the second shape of the outlet port, the hollow outlet portion intersects each of a surface of the hollow inlet portion adjacent the end thereof and a surface of the end to provide a passageway from the inlet port to the outlet port, a size of the hollow outlet portion at an intersection with the hollow inlet portion being smaller than a size of the hollow outlet portion at the outlet port.

A feature of this embodiment is that a combined area of the hollow inlet portion and the hollow outlet portion is being substantially equal to either one of the area of the inlet port and the area of the outlet port.

A feature of this embodiment is that the hollow outlet portion continues from the intersection toward the inlet surface, past the one end of the hollow inlet portion.

A feature of this embodiment is that the outlet surface comprises a cavity, the cavity being sized and shaped to receive a nozzle adapter with a through opening, the through opening being sized and shaped differently than the outlet port.

A feature of this embodiment is that the hollow inlet portion and the hollow outlet portion define a continuous straight surface portion of the passageway.

In an embodiment, a nozzle comprises a nozzle body, comprising an inlet nozzle body portion with an inlet surface and an inlet port in the inlet surface, an outlet nozzle body portion with an outlet surface and an outlet port in the outlet surface, the outlet surface being disposed at an incline to the inlet surface, the inlet nozzle body portion and the outlet nozzle body portion defining a common flat exterior surface of the nozzle body, the common flat exterior surface connecting the inlet surface with the outlet surface; an inlet cavity in an open communication with the inlet port, the inlet cavity extending, along an axis disposed in a plane being parallel to the common flat exterior surface, from the inlet port into the outlet nozzle body portion; and an outlet cavity the outlet nozzle body portion and in an open communication with the outlet surface, the outlet cavity configured to intersect the inlet cavity.

In an embodiment, a nozzle comprises a nozzle body, comprising an inlet nozzle body portion with an inlet surface and an inlet port in the inlet surface, an outlet nozzle body portion with an outlet surface with an outlet port in the outlet surface, the outlet surface being disposed at an incline to the inlet surface, the inlet nozzle body portion and the outlet nozzle body portion defining a common flat exterior surface of the nozzle body, the common flat exterior surface connecting the inlet surface with the outlet surface; an inlet cavity in an open communication with the inlet port, the inlet cavity extending, along an axis disposed in a plane being parallel to the common flat exterior surface, from the inlet port into the outlet nozzle body portion; an outlet cavity in the outlet nozzle body portion and in an open communication with the outlet surface, the outlet cavity configured to intersect the inlet cavity.

In an embodiment, a mechanical foam fire fighting equipment comprises a mechanical foam making assembly defining a foaming chamber area for receiving a liquid and a foam concentrate and an inert gas; a supply of inert gas; an element configured to communicate the inert gas to the foaming chamber area; and a muzzle, as described above.

In an embodiment, a foam generating system for an automated carwash comprises a foam generator for connecting to a water source and a detergent source, the foam generator having an input and an output outputting a foaming fluid formed from air, water from the water source, and a detergent from the detergent source; an input nozzle attached to the input of the foam generator and having an output; an agitating nozzle disposed in the output of the input nozzle, the agitating nozzle configured for spinning and accelerating the foaming fluid flowing from the agitating nozzle into the foam generator; the foam generator having a foamer brush disposed downstream of the agitating nozzle for producing foam from the foaming fluid; and an output nozzle, as described above, disposed downstream of the foam generator for outputting the foam generated from the foaming fluid.

Also discloses are exemplary methods of broadcasting substance in view of the above disclosed nozzle.

In an embodiment, a method may be achieved by configuring an outlet of a nozzle with an area being identical to an area of an inlet and with a shape being different to a shape of the inlet; connecting the inlet and the outlet with a passageway where a hollow outlet portion intersects each of a surface of a hollow inlet portion adjacent an end thereof and a surface of the end; and discharging a substance flow from through the outlet in a response to a receipt of the substance flow at the inlet.

In an embodiment, a method may be achieved by configuring a nozzle with a single inlet and a plurality of outlets, connecting each outlet from the plurality of outlets with passageways in a fluid communication with the inlet, and discharging a substance flow from through the plurality of outlets in a response to a receipt of the substance flow at the inlet.

In an embodiment, a method may be achieved by configuring an outlet of a nozzle with an area being identical to an area of an inlet and with a shape being different to a shape of the inlet; connecting the inlet and the outlet with a passageway where a hollow outlet portion intersects each of a surface of a hollow inlet portion adjacent an end thereof and a surface of the end; and converting bubbles in a substance flow from having elongated shapes at the inlet to bubbles having spherical shapes when discharged from the outlet.

In an embodiment, a method for extinguishing fires comprises supplying a liquid, a foam concentrate and an inert gas to a foaming chamber area foam of a mechanical making assembly; mechanically producing inert foam; and discharging inert foam from the chamber area through a nozzle, as described above.

Any of the above described methods may include threading the hollow inlet portion. Any of the above described methods may include inclining an outlet surface relative to an inlet surface. Any of the above described methods may include attaching an adapter to the outlet where the adapter includes a through aperture with a shape different to the shape of the outlet.

Figure 15:
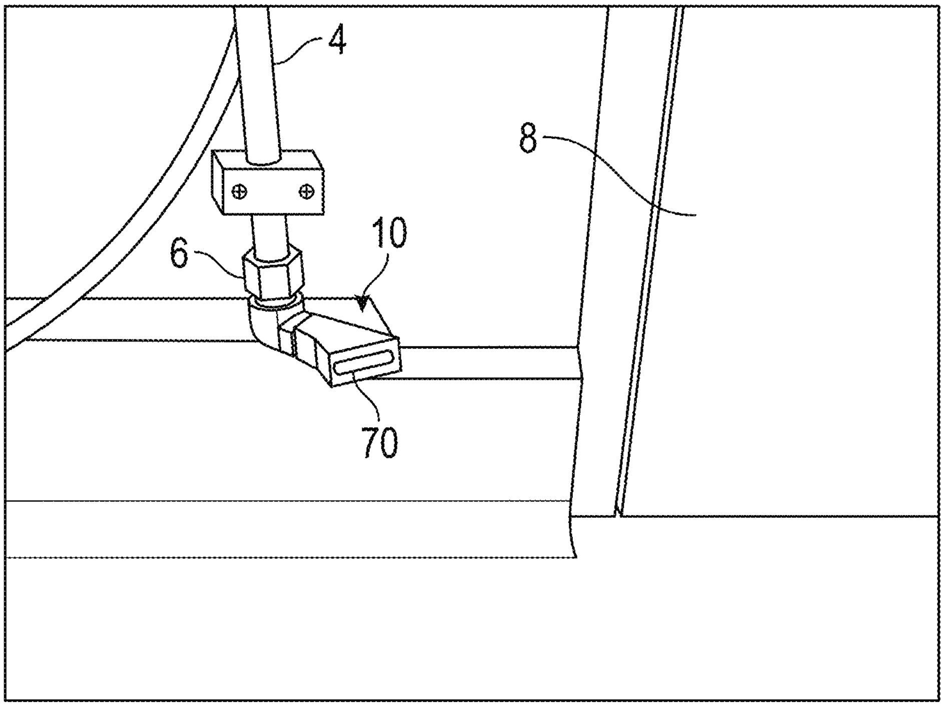
FIG. 15 illustrates an environmental view of the nozzle of FIG. 1.
Figure 16:
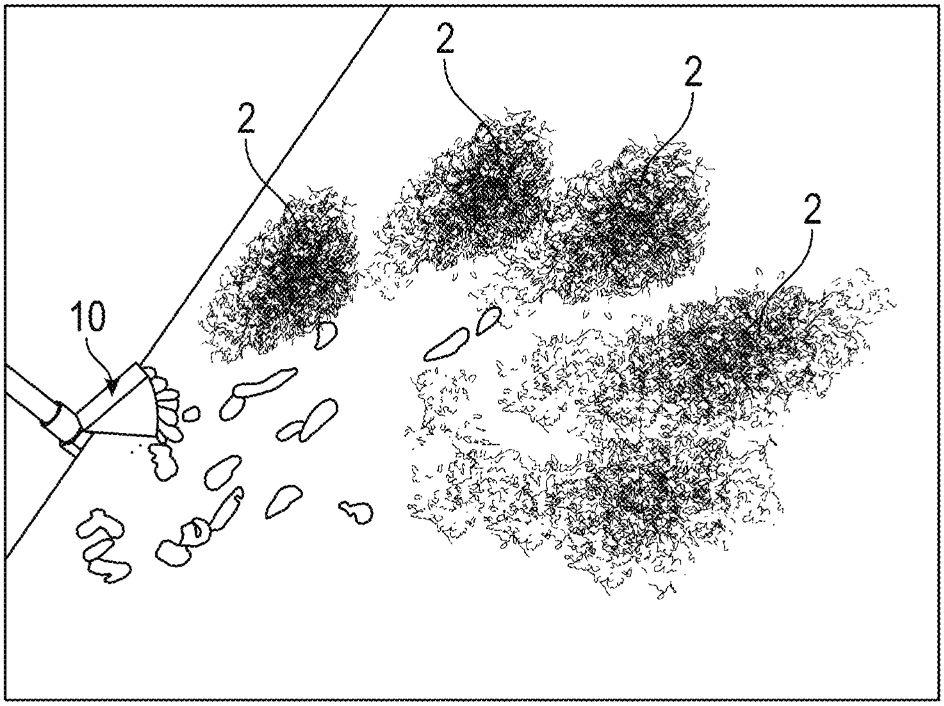
FIG. 16 illustrates an environmental view of the nozzle of FIG. 1 configured to broadcast five (5) distinct portions of a substance.
Figure 17:
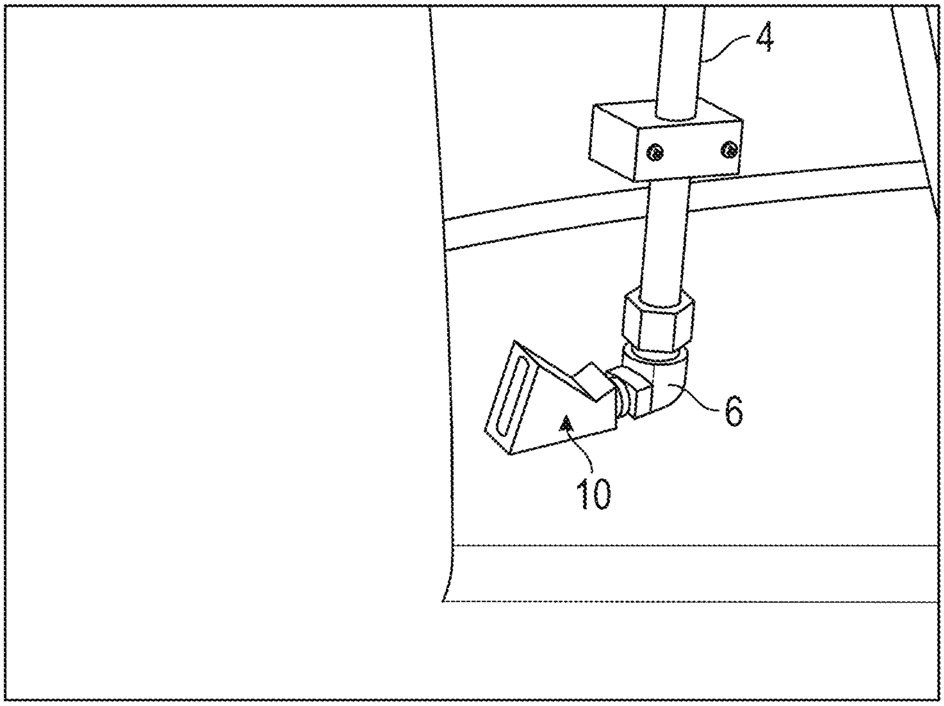
FIG. 17 illustrates an environmental view of the nozzle of FIG. 1.

Now in a further reference to the Figures:

FIG. 1 illustrates an elevation view of a nozzle 10. The body of the nozzle 10 is referenced with numeral 20. The outlet surface is referenced with numeral 60. The inlet portion of the body 20 is referenced with numeral 22 and the outlet portion of the body 20 is referenced with numeral 24. The inlet surface is referenced with numeral 30 and can be referred to as an inlet end surface or an inlet end of the body 20 and the nozzle 10. The outlet surface is referenced with numeral 60 and can be referred to as an outlet end surface or an outlet end of the body 20 and the nozzle 10. The outlet surface 60 is inclined (disposed at an angle) relative to the inlet surface 30. The outlet portion 24 may also be designed with another inclined surface connecting the inclined surface 60 with the inlet portion 22. In view of the above, the body 20 may be provided as a pair of body portions 22 and 24 that may be the inlet portion 22 and the outlet portion 24. This elevation view in FIG. 1 may be referred to as a front view. The common flat surface, when provided, is referenced with numeral 26. However, the common flat surface 26 may be an optional feature of the nozzle 10. The nozzle 10, installed as illustrated in FIG. 17, may be used for spraying substance for a longer distance. The nozzle 10 may be installed at a rotation of 90 degrees in a relationship to the illustration of FIG. 1, as is shown in FIGS. 15 and 16. The nozzle 10 may be rotated and installed at angles other than 90 degrees. The nozzle 10 of FIG. 1 may be configured with all flat surface.

Figure 2:
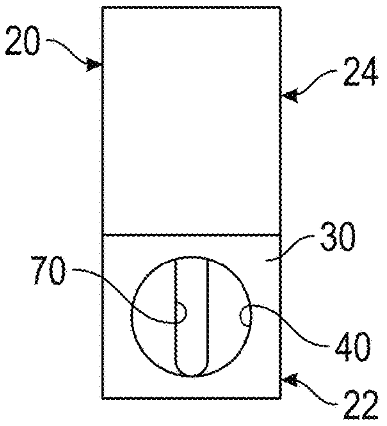
FIG. 2 illustrates an elevation view of the nozzle of FIG. 1.

FIG. 2 illustrates an elevation view of the nozzle 10. This elevation view can be referred to as a side view, as an end view or as an inlet (side/end) view. The inlet port is referenced with numeral 40. The inlet port 40 is illustrated as an opening with a round shape or cross-section.

Figure 3:
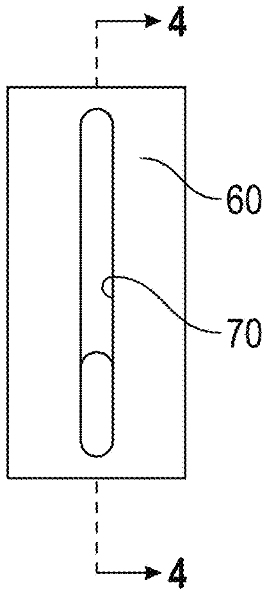
FIG. 3 illustrates an elevation view of the nozzle of FIG. 1.

FIG. 3 illustrates an elevation view of the nozzle 10. This elevation view can be referred to as a side view, as an end view or as an outlet (side/end) view. The outlet port is referenced with numeral 70. The inlet port 40 is illustrated as an elongated opening.

Figure 4:
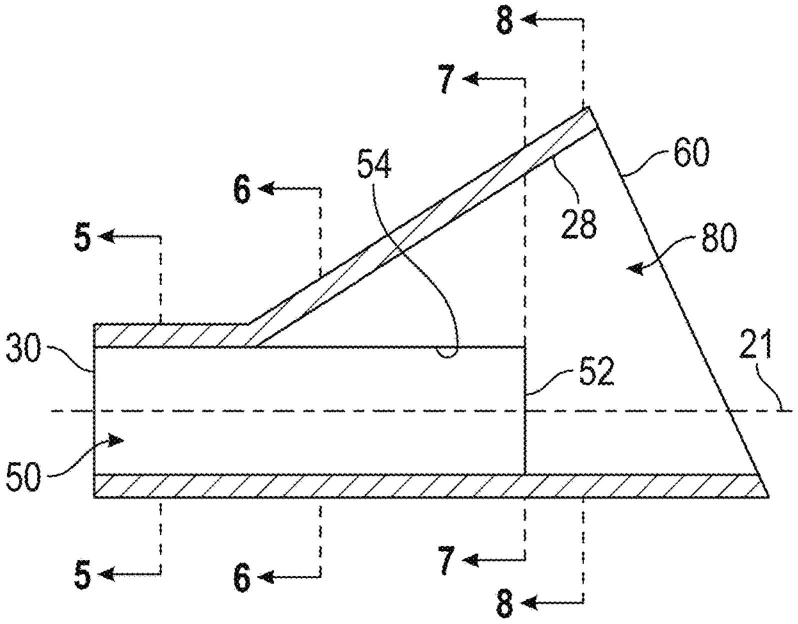
FIG. 4 illustrates a cross-sectional view of the nozzle along lines 4-4 of FIG. 3.

FIG. 4 illustrates a cross-sectional view of the nozzle 10 along lines 4-4 of FIG. 3. Hollow inlet portion is referenced s 4 with numeral 50 and a hollow outlet portion is referenced with numeral 80. This hollow inlet portion 50 has the above described end 52 and a surface 54 that is being intersected by a surface of the hollow outlet portion 80. FIG. 4 clearly illustrates that the hollow outlet portion 80 protrudes past the inlet hollow portion 22 toward the inlet surface 30. As has been described above, the combination of the hollow inlet portion 50 and the hollow outlet portion 80 defines the hollow interior of the nozzle 10. As has been described above, the combination of the hollow inlet portion 50 and the hollow outlet portion 80 defines the passageway of the nozzle 10. The intersection of the hollow outlet portion 80 with the end 52 and subsequent intersection with and an overlap of the hollow outlet portion 80 over the surface 54 at least significantly reduces if not eliminates restriction to substance flow through the nozzle 10 as the cross-sectional area of the substance flow remains essentially unchanged from this transition area defined by the above described intersection. FIG. 4 also illustrates a wall 28 that is disposed at an incline to the common flat surface 26. An axis 21 is disposed in a plane being parallel to a plane of the common flat surface 26. The axis 21 also defines a direction of the substance flow.

Figure 5:
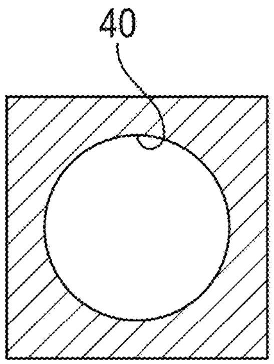
FIG. 5 illustrates a cross-sectional view of the nozzle along lines 5-5 of FIG. 4.

FIG. 5 illustrates a cross-sectional view of the nozzle along lines 5-5 of FIG. 4. The shape of the hollow inlet portion 50 follows the shape of the inlet port 40.

Figure 6:
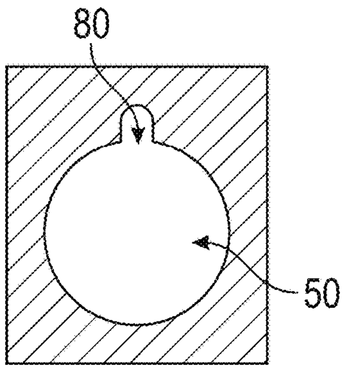
FIG. 6 illustrates a cross-sectional view of the nozzle along lines 6-6 of FIG. 4.

FIG. 6 illustrates a cross-sectional view of the nozzle along lines 6-6 of FIG. 4, which is adjacent the end of the body portion 22. The hollow outlet portion 80 is shown as being reduced in size as compared to a size of the outlet port 70, but (partially) retaining the original shape of the outlet port 70.

Figure 7:
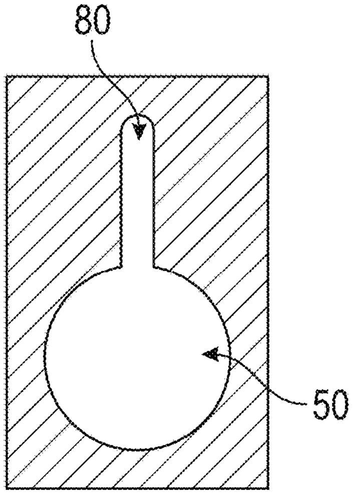
FIG. 7 illustrates a cross-sectional view of the nozzle along lines 7-7 of FIG. 4.

FIG. 7 illustrates a cross-sectional view of the nozzle along lines 7-7 of FIG. 4, taken at the end 52 of the hollow inlet portion 50. The hollow outlet portion 80 is shown as being reduced in size as compared to the size of the outlet port 70 but is larger than the size of the hollow outlet portion 80 of FIG. 6 and (partially) retaining the original shape of the outlet port 70.

Figure 8:
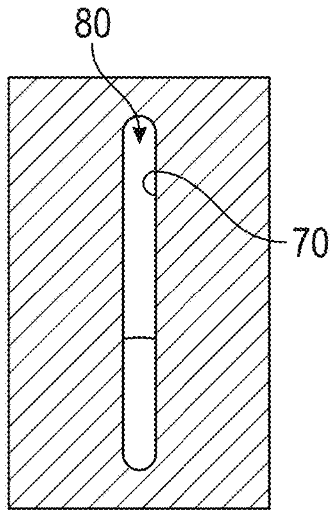
FIG. 8 illustrates a cross-sectional view of the nozzle along lines 8-8 of FIG. 4.

FIG. 8 illustrates a cross-sectional view of the nozzle along lines 8-8 of FIG. 4. The hollow outlet portion 80 in FIG. 8 is shown as being near the outlet surface 60.

Figure 9:
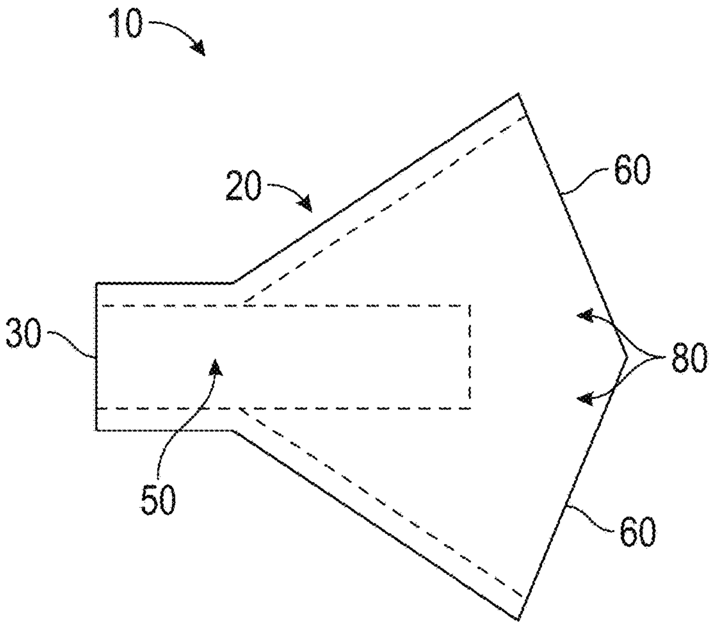
FIG. 9 illustrates a top view of a nozzle.

FIG. 9 illustrates a top view of a nozzle 10 with two outlet surfaces 60 and two hollow outlet portions 80, as compared to the nozzle 10 of FIG. 1. More than two hollow outlet portions 80 may be used.

Figure 9A:
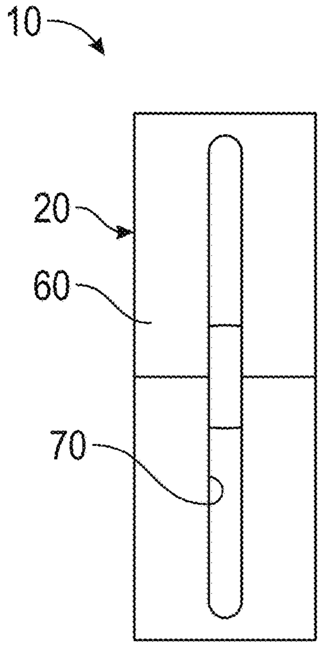
FIG. 9A illustrates a side view of the nozzle in FIG. 9.

FIG. 9A illustrates a side view of the nozzle in FIG. 9 designed with the above described outlet port (outlet opening) 70. The nozzle 10 of FIG. 9 may be configured with more than one outlet port than what is illustrated in FIG. 9A, including outlet ports of different shapes and/or sizes.

Figure 10:
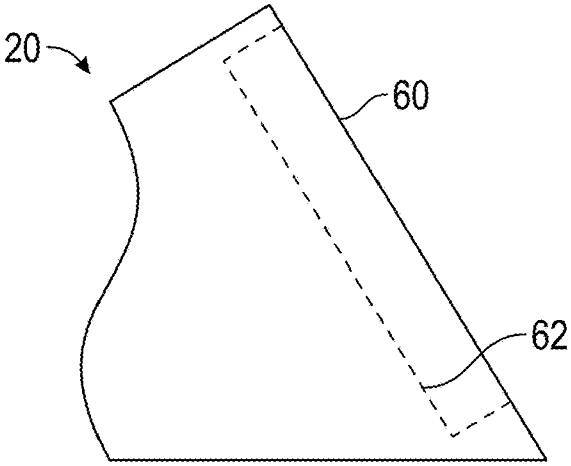
FIG. 10 illustrates a partial elevation view of a nozzle.

FIG. 10 illustrates a partial elevation view of a nozzle 10, with a cavity 62 in the outlet surface 60 to accept a nozzle adapter 90.

Figure 11:
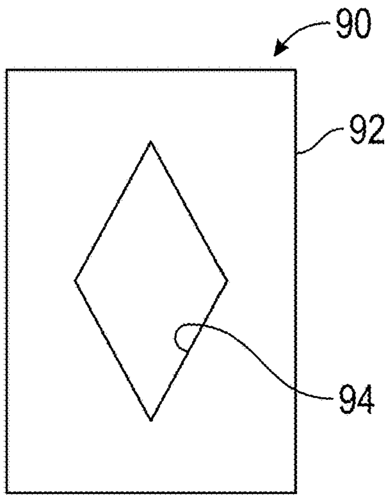
FIG. 11 illustrates a nozzle adapter.

FIG. 11 illustrates the nozzle adapter 90 with a plate-shaped configuration 92 and with a single through aperture (opening) 94 which differs in shape from the shape of the outlet port 70 but has an area that is equal to the area of the outlet port 70.

Figure 12:
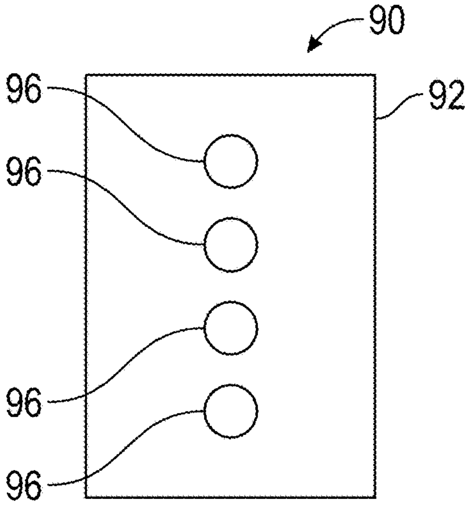
FIG. 12 illustrates a nozzle adapter.

FIG. 12 illustrates the nozzle adapter 90 with the plate-shaped configuration 92 and with plurality of through aperture 96 which differs in shape from the outlet port 70, but that, in a combination with each other, provide the same area.

Figure 13:
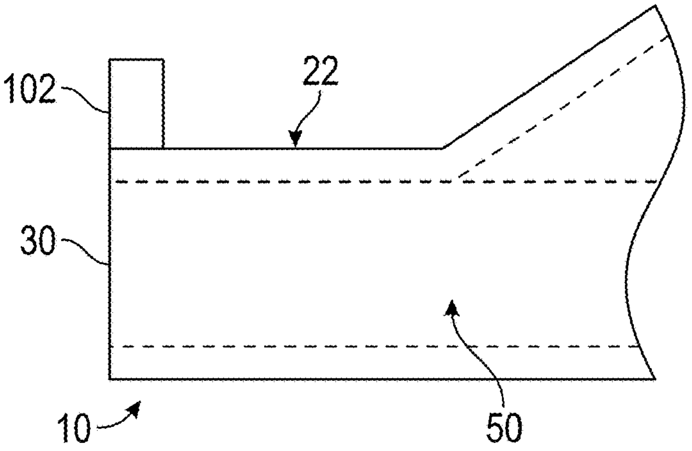
FIG. 13 illustrates a partial elevation view of a nozzle.

FIG. 13 illustrates a connection element 102, such as a pin, with a source of substance supply. The pin upstands on an exterior surface of the inlet portion 22 and is designed to interlock with a groove (not shown) to detachably connect the nozzle 10 to a source of the substance flow supply to the inlet.

Figure 14:
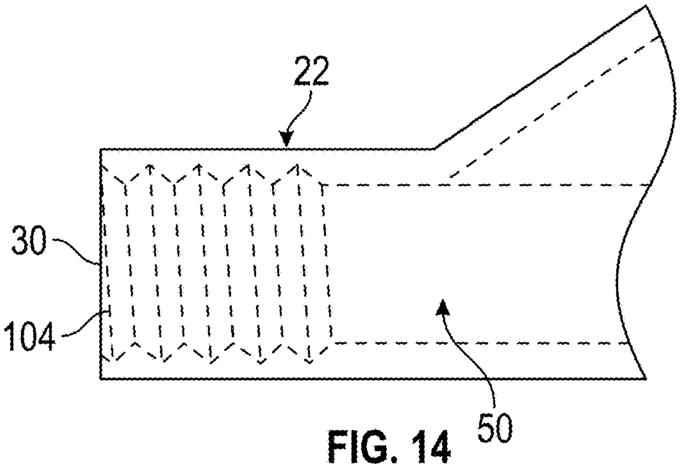
FIG. 14 illustrates a partial elevation view of a nozzle.

FIG. 14 illustrates a connection element 104, such as a thread, within the inlet portion 22 that is designed to detachably and threadably attach the nozzle 10 to a source of the substance flow supply to the inlet.

FIG. 15 illustrates an environmental view of the nozzle 10 with the outlet port 70 being in a horizontal orientation. The nozzle 10 is attached to the source of substance flow supply 4, shown as a rigid pipe, with a threaded connection 6. The nozzle 10 is also illustrated as being position adjacent a door 8. The nozzle 10 may be also attached to an end of a flexible hose.

FIG. 16 illustrates an environmental view of the nozzle 10 with five (5) outlets (outlet ports) to broadcast five (5) distinct portions of the substance 2, that may be the mechanical foam, as described above. Each portion of the mechanical foam comprises a plurality of beads or droplets. It can be seen in FIG. 16 that the five (5) distinct portions are broadcasted at different angles (different directions) and are also broadcasted at different distances from the nozzle 10.

FIG. 17 illustrates an environmental view of the nozzle 10 with the outlet port 70 being in a vertical orientation. When the nozzle 10 of FIG. 17 is used to dispense mechanical foam, the mechanical foam increases in height and decreases in width between the inlet port 40 and the outlet port 70.

It should be appreciated that reference throughout this specification to “one embodiment” or “an embodiment”, “exemplary embodiment” that a means particular feature, structure or characteristic described in connection with the embodiment is included in at least one embodiment of the disclosed subject matter. Therefore, it is emphasized and should be appreciated that two or more references to “an embodiment” or “one embodiment” or “exemplary embodiment” in various portions of this specification are not necessarily all referring to the same embodiment or the same variation. Furthermore, the particular features, structures or characteristics may be combined as suitable in one or more embodiments of the disclosed subject matter.

The chosen exemplary embodiments of the claimed subject matter have been described and illustrated for practical purposes so as to enable any person skilled in the art to which it pertains to make and use the same. It is therefore intended that all matters in the foregoing description and shown in the accompanying drawings be interpreted as illustrative and not in a limiting sense. It will be understood that variations, modifications, equivalents and substitutions for components of the specifically described exemplary embodiments of the subject matter may be made by those skilled in the art without departing from the spirit and scope of the subject matter as set forth in the appended claims.

Any element in a claim that does not explicitly state "means for" performing a specified function, or "step for" performing a specified function, is not to be interpreted as a "means" or "step" clause as specified in 35 U.S.C. sctn. 112, paragraph 6. In particular, any use of "step of" in the claims is not intended to invoke the provision of 35 U.S.C. sctn. 112, paragraph 6.

Furthermore, the Abstract is not intended to be limiting as to the scope of the claimed subject matter and is for the purpose of quickly determining the nature of the claimed subject matter.

What is claimed is:

1. A nozzle, comprising:

a body;

a hollow interior;

an inlet in one exterior surface of the body, the inlet being in a fluid flow connection with the hollow interior;

an outlet in a different exterior surface of the body, the outlet being in the fluid flow connection with the hollow interior; and a continuous straight surface portion within the hollow interior between the inlet and the outlet; and the outlet having a shape being different than a shape of the inlet;

the outlet having an area at the different exterior surface of the body being equal to an area of the inlet at the one exterior surface of the body;

wherein the inlet, the outlet, and the hollow interior being configured to convert a shape of a bubble in a mechanical foam from an elongated shape at the inlet into a spherical shape at the outlet.

2. The nozzle of claim 1, wherein the hollow interior comprises a transition, within the body, from a round shape in a plane normal to a direction of a substance flow at the inlet to an elongated shape at the outlet.

3. The nozzle of claim 1, wherein the inlet, outlet, and the hollow interior being configured to discharge a substance flow from the outlet, the substance flow being received through the inlet and passed through the hollow interior, without a restriction to the substance flow within the hollow interior.

4. The nozzle of claim 1, wherein the outlet comprises an adapter with a through aperture, the adapter being in a detachable connection with an exterior surface of the body.

5. The nozzle of claim 4, wherein the detachable connection comprises a cavity in the adapter, the cavity being sized and shaped to receive an end of the body therewithin.

6. The nozzle of claim 1, wherein the outlet comprises a plurality of outlets.

7. The nozzle of claim 1, wherein the body comprises a cavity, the cavity being sized and shaped to receive a nozzle adapter with an opening through a thickness of the nozzle adapter, the opening comprising a size and a shape being different than the size and the shape of the outlet.

8. The nozzle of claim 1, wherein the hollow interior comprises:

a hollow inlet portion extending from the inlet toward the outlet, the hollow inlet portion having a cross-sectional shape being identical to a shape of the inlet, an end of the hollow inlet portion disposed at a distance from a different surface of the body;

a hollow outlet portion extending from the outlet toward the inlet, the hollow outlet portion having a shape being identical to a shape of the outlet; and a portion between the inlet and the outlet, the portion having a combination of the hollow inlet portion and the hollow outlet portion.

9. A nozzle, comprising:

an inlet surface with an inlet port in the inlet surface, the inlet port having a first shape;

at least one outlet surface with an outlet port in the at least one outlet surface, the at least one outlet surface being disposed at an incline to the inlet surface, the outlet port having a second shape, the second shape being different than the first shape, the outlet port having an area being equal to an area of the inlet port;

a hollow inlet portion extending from the inlet port toward the outlet port, the hollow inlet portion having a cross-sectional shape being identical to the first shape, an end of the hollow inlet portion disposed at a distance from the outlet surface; and at least one hollow outlet portion extending from the outlet port toward the inlet port, the at least one hollow outlet portion having a shape being identical to the second shape of the outlet port, the at least one hollow outlet portion intersects each of a surface of the hollow inlet portion adjacent the end thereof and a surface of the end to provide a passageway from the inlet port to the outlet port, a size of the at least one hollow outlet portion at an intersection with the hollow inlet portion being smaller than a size of the hollow outlet portion at the outlet port, a portion of the passageway being defined by a combination of the hollow inlet portion and the at least one hollow outlet portion configured to intersect and overlap one another, wherein the at least one hollow outlet portion being further configured to reduce in size in a direction toward the inlet surface, and wherein the cross-sectional shape of the hollow inlet portion being generally constant in area and being continuous from the inlet surface to an intersection with the at least one hollow outlet portion.

10. The nozzle of claim 9, wherein the inlet port comprises a thread extending into the hollow inlet portion.

11. The nozzle of claim 9, wherein the hollow inlet portion, the hollow outlet portion, and the combination being configured to convert a shape of a bubble in a mechanical foam from an elongated shape at the inlet port into a spherical shape at the outlet port.

12. The nozzle of claim 9, wherein a combined area of the hollow inlet portion and the hollow outlet portion is being substantially equal to either one of the area of the inlet port and the area of the outlet port.

13. The nozzle of claim 9, wherein the hollow outlet portion continues from the intersection toward the inlet surface, past one end of the hollow inlet portion.

14. The nozzle of claim 9, wherein the outlet surface comprises a cavity, the cavity being sized and shaped to receive a nozzle adapter with an opening through a thickness of the nozzle adapter, the opening comprising a size and a shape being different than the size and the shape of the outlet port, the nozzle adapter having a plate shape.

15. The nozzle of claim 9, wherein the hollow inlet portion and the hollow outlet portion define a continuous straight surface portion of the passageway.

16. The nozzle of claim 9, wherein the hollow inlet portion, the hollow outlet portion, and the combination being configured to convert a shape of a bubble in a mechanical foam from an elongated shape at the inlet port into a spherical shape at the outlet port in a response to a flow of the mechanical foam through the passageway without a restriction to the flow.

17. A nozzle, comprising:

a nozzle body, comprising:

an inlet nozzle body portion with an inlet surface and an inlet port in the inlet surface, an outlet nozzle body portion with an outlet surface and an outlet port in the outlet surface, the outlet surface being disposed at an incline to the inlet surface, the inlet nozzle body portion and the outlet nozzle body portion defining a common flat exterior surface of the nozzle body, the common flat exterior surface connecting the inlet surface with the outlet surface, the outlet surface being further disposed at the incline to the common flat exterior surface, and a wall of the outlet nozzle body portion being disposed at another incline to the common flat exterior surface;

an inlet cavity in a fluid flow connection with the inlet port, the inlet cavity extending, along an axis disposed in a plane being parallel to a plane of the common flat exterior surface, from the inlet port into the outlet nozzle body portion, the inlet cavity having a round cross-sectional shape in a plane normal to the axis; and an outlet cavity in the outlet nozzle body portion and in the fluid flow connection with the outlet surface, the outlet cavity having an elongated cross-sectional shape, the outlet cavity and the inlet cavity being configured to intersect one another to define an interior hollow portion with a combination of the round cross-sectional shape and the elongated cross-sectional portion.

18. The nozzle of claim 17, wherein the inlet port comprises a round shape.

19. The nozzle of claim 17, wherein the outlet port comprises an elongated shape.

20. The nozzle of claim 17, wherein the outlet port comprises a shape being different than a shape of the inlet port.

* * * * *